R. L. LEACH.
VEHICLE TIRE.
APPLICATION FILED FEB. 5, 1914.
1,137,498.
Patented Apr. 27, 1915.
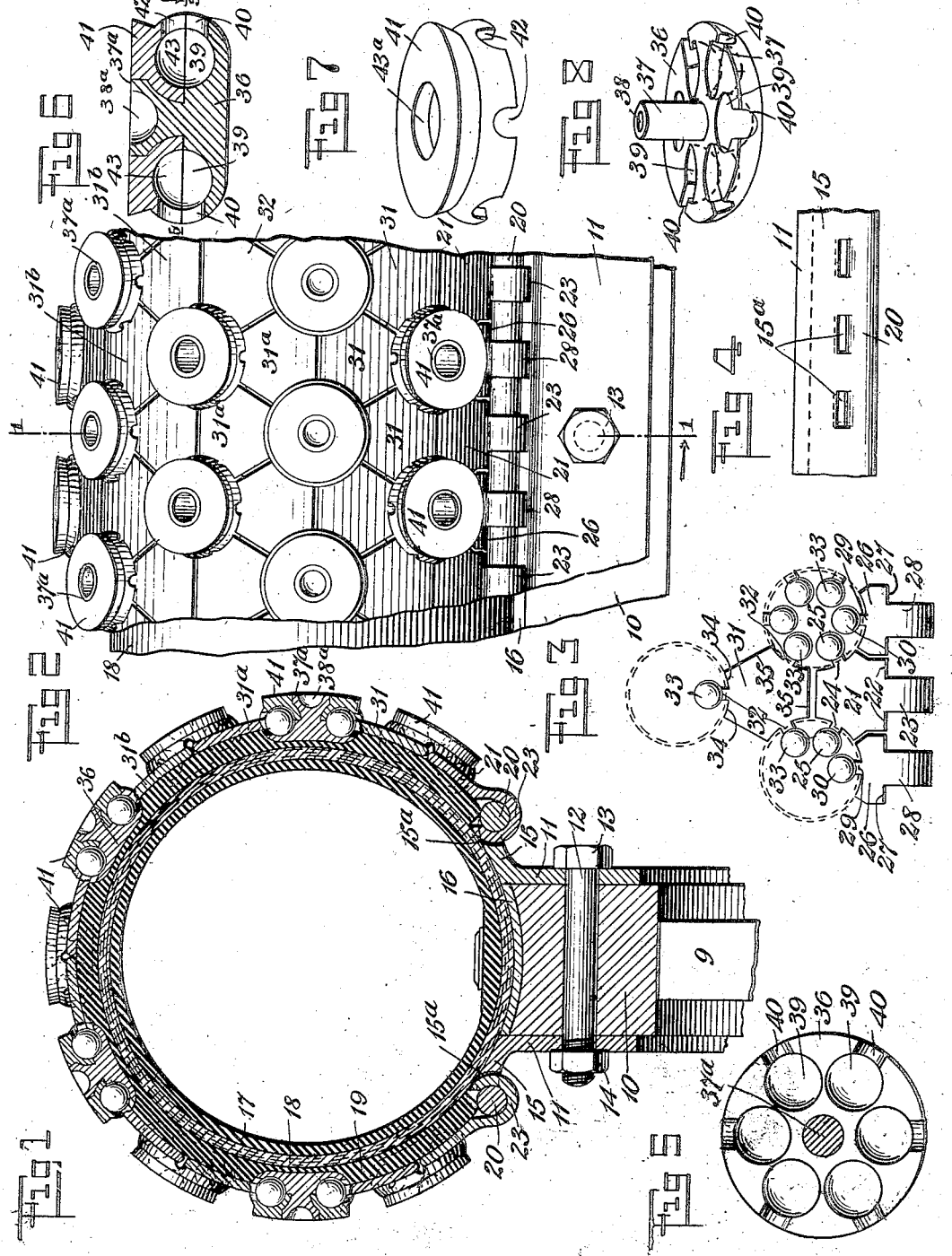
WITNESSES
C. J. Hachenberg
Walton Harrison
INVENTOR
Richard L. Leach
BY Munn & Co
ATTORNEYS

UNITED STATES PATENT OFFICE.

RICHARD LAWRENCE LEACH, OF HONOLULU, TERRITORY OF HAWAII.

VEHICLE-TIRE.

1,137,498.

Specification of Letters Patent.   Patented Apr. 27, 1915.

Application filed February 5, 1914. Serial No. 816,739.

*To all whom it may concern:*

Be it known that I, RICHARD L. LEACH, a citizen of the United States, and a resident of Honolulu, in the county of Honolulu and Territory of Hawaii, have invented a new and useful Vehicle-Tire, of which the following is a description.

My improved vehicle tire is of the general type disclosed in my Patent No. 1,077,085, dated Oct. 28th, 1913.

Among the various objects of my present invention are the following: I. To enable the tire casing to be hooked to the roll of the wheel rim, from the outside, so as to render the tire casing and the tire both readily detachable from the rim, and also to enable the tire to drop off the rim or at least to be easily detached therefrom, when the tire is deflated. II. To give the plates of the tire casing such form as to enable them to practically cover all portions of the tire which otherwise would be exposed. III. To provide anti-skidding lugs of improved form, and to provide improved means for securing these lugs in position and for holding them to the casing as well as to the tire. IV. To give the rubber member of the tire such form that its outer surface is irregular in order to fit the different shaped members of the tire casing, the inner portion of the rubber member of the tire being smooth. V. To improve the resistance of the tire and its casing as against punctures and abrasions, and to provide improved means for enabling the metallic portions of the tire casing to take up and sustain the pressure of the tire due to inflation thereof.

Reference is made to the accompanying drawings forming a part of this specification, and in which like letters indicate like parts.

Figure 1 is a vertical cross section through my improved tire and its casing. Fig. 2 is a side elevation of the mechanism shown in Fig. 1. Fig. 3 is a detail, partly in section and partly diagrammatic, showing how the armor plates and parts immediately associated therewith are connected together. Fig. 4 is a detail, showing a portion of a wheel rim forming a part of my invention. Fig. 5 is a section on the line 5—5 of Fig. 6, looking in the direction of the arrow, and showing a part of one of the anti-skid lugs. Fig. 6 is a detail view, showing in section one of the anti-skid lugs complete. Fig. 7 is a perspective, showing a part of one of the anti-skid lugs. Fig. 8 is a perspective, showing one of the blanks used in constructing a part of each anti-skid lug.

One of the spokes is shown at 9, and mounted upon the same is an annular felly 10. Disposed upon opposite sides of this felly are two flat rings 11, held in position and clamped against the felly by bolts, one of which is shown at 12. This bolt is provided with a head 13 and is fitted with a nut 14. Each ring 11 is provided with an outwardly turned or flaring portion 15, and between the rings 11 and engaging the outer peripheral surface of the felly 10 is a lining ring 16.

The inner tube of the tire is shown at 17, and the fiber jacket of the tire appears at 18. Secured to this fiber jacket and partially encircling the same is the tire covering 19, which is a member made of rubber. The flaring portions 15 of the rings 11 are each provided with slots $15^a$ and partially bounding these slots are two supporting rings 20, secured firmly to the outer peripheral edges of the flaring portions 15, and constituting practically parts of the rim roll of the wheel. Located in close proximity to each ring 20 are a number of armor plates 21, each provided at its bottom with straight edges 22, and further provided with a tongue 23, this tongue being bent into proximate C-shape and thus formed into a hook, as may be understood from Fig. 1, and adapted to fit into any one of the slots $15^a$. The armor plate 21 is further provided with a pair of necks 24, each carrying a ball 25, integral with it. Located adjacent the plates 21 and alternated therewith are a number of other plates 26, each provided with straight edges or shoulders 27, and with a substantially C-shaped hook 28 precisely like the hook 23 above described. Each plate 26 is further provided with a single neck 29 carrying a ball 30, these parts being integral.

A number of other armor plates $31^a$, $31^b$, are provided, these plates being exactly alike except as to size. That is to say, the plates $31^a$ are slightly larger than the plates 31, and the plates $31^b$ are slightly larger than the plates $31^a$, so that the various plates employed increase in size, reckoning from the rim of the wheel to the outer peripheral surface, or tread surface of the tire. This difference in the size of the plates $31^a$, $31^b$, is merely to compensate for differences in the diameter of different portions of the tire. Each of the plates 31 is provided with three necks 32 and with concave shoulders 34 of arcuate form, there being two of these shoulders upon opposite sides of each neck 32. Each of the plates 31ª, 31ᵇ, is further provided with three straight edges 35, each of these edges being disposed between two of the arcuate edges 34, as will be understood from Fig. 3.

I use a number of metallic bearing disks 36 which are partially sunken into the rubber member jacket 19. Each of these bearing disks is provided centrally with a projecting stem 37, this stem having a central opening 38. Each disk 36 is further provided with a cavity 39 of substantially hemispherical form, and with a passage 40 having a semi-cylindrical form and merging into the cavity 39. A separate disk 41 is provided with a number of semi-cylindrical passages 42 and with a number of substantially hemispherical cavities 43 into which the passages 42 merge, as shown in Fig. 6. The disk 41 is further provided with a bell-shaped aperture 43ª, through which the stem 37 of the disk 36 may be extended. After the stem 37 is thus extended through the aperture 43ª, the stem 37 is spread or clenched as shown at 37ª in Fig. 6, the opening 38 of the stem being thus enlarged, as indicated at 38ª.

The various parts are assembled as follows: The disks 36 are spaced apart by suitable distances and the various plates 21, 26, 31, 31ª, and 31ᵇ are arranged relatively to each other, as indicated in Figs. 2 and 3, so that the various balls 25, 30, 33 are partially inserted within the various cavities 39. A number of disks 41 equal to the number of disks 36 are next placed in position, so that the upper portions of the various balls 25, 30, 33, extend into the hemispherical cavities 43. The various necks 24, 29, 32, are at the same time fitted into the semi-cylindrical passages 40, 42, the latter brought into juxtaposition, or in other words caused to mate each other. In arranging the plates 31, 31ª, 31ᵇ, the larger size plates are disposed near the outer peripheral or tread surface of the tire, as above indicated. The stems 37 being next clenched, as indicated in Fig. 5, each disk 41 is secured rigidly to its mating disk 36, and the tire armor as a whole is now complete. The tire as a whole being now complete, the various hooks 23, 28 are brought into the slots 15ª, and hooked upon the rings 20. The tire being now inflated in the usual manner, the distension of the tire causes the hooks 23 and 28 to grip the rings 20 very tightly. If, however, the tire becomes deflated, the hooks 23 and 28 become disconnected from the rings 20, so that the tire practically falls off of the wheel. At least the tire is very easily disconnected from the rim. Each pair of disks 36, 41, when secured together as indicated in Fig. 6, constitute an anti-skid, which, when brought into engagement with a road or pavement, has a marked tendency to prevent the tire from skidding. It will be noted that when the tire is in position and inflated, any excess of strain due to inflation is thrown upon the tire armor.

Having thus described my invention, what I claim as new and desire to secure by Letters Patent is as follows:

1. In a tire, the combination of a tubular portion, a rubber jacket partly encircling the same, disks sunken slightly into said rubber jacket and provided with cavities of substantially hemispherical form, and with passages of substantially semi-cylindrical form, said passages merging into said cavities, plates provided with necks for extending through said passages and with balls carried by said necks for fitting into said cavities, and other disks connected with said first mentioned disks and provided with bearing portions for fitting upon said necks and said balls.

2. In a tire armor, a covering of rubber partially encircling a tire, a plurality of anti-skid members spaced apart and each partially sunken in the rubber covering, a plurality of plates disposed about the anti-skid members, means forming ball and socket connections between the said plates and the anti-skid members, and means for connecting sundry of said plates with the wheel rim to hold the armor in position on the tire.

3. In a tire armor, the combination of a plurality of anti-skid members each being substantially circular in form and provided with sockets and with passages merging into said sockets, and a plurality of plates each provided with a member extending into one of said sockets and with a neck extending through one of said passages, each of said plates being provided with a plurality of straight edges and with a plurality of curved edges of arcuate form, said curved edges being located between said straight edges.

4. In a tire armor, the combination of a pair of disks connected together by a centrally disposed member carried by one of said disks and engaging the other, said disks together being provided with sockets arranged in a circle and with radially disposed passages merging into said sockets, and a plurality of plates arranged around the said disks and each comprising a body portion having a curved edge corresponding in shape to the periphery of the disks, the plates being each provided with a neck extending from the body portion through one of said passages and with a spherical member carried by said neck and fitting into one of said sockets, so that said plates are connected to said disks by ball and socket joints.

5. The combination with a wheel rim, of an inflatable tire mounted upon the rim, a tire covering of rubber partly encircling the tire, and an armor comprising a plurality of anti-skid members each having a disk partially sunken in the rubber covering and a mating disk adapted to be secured to the first disk, a plurality of plates disposed about the anti-skid members, means forming ball and socket connections between the said plates and the anti-skid members, and means for securing the armor to the wheel rim.

RICHARD LAWRENCE LEACH.

Witnesses:
P. H. BURNETTE,
CHAS. JONES.